(12) United States Patent
Hirasawatsu et al.

(10) Patent No.: US 7,077,641 B2
(45) Date of Patent: Jul. 18, 2006

(54) PREFORM CONVEYING DEVICE

(75) Inventors: Tadao Hirasawatsu, Tokyo (JP); Shigeaki Amari, Tokyo (JP); Goichi Kato, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 204 days.

(21) Appl. No.: 10/497,318

(22) PCT Filed: Jan. 28, 2003

(86) PCT No.: PCT/JP03/00765

§ 371 (c)(1),
(2), (4) Date: Jun. 2, 2004

(87) PCT Pub. No.: WO03/064138

PCT Pub. Date: Aug. 7, 2003

(65) Prior Publication Data

US 2005/0048159 A1    Mar. 3, 2005

(30) Foreign Application Priority Data

Jan. 28, 2002    (JP)    ............................. 2002-017792

(51) Int. Cl.
  *B29C 49/42*    (2006.01)
(52) U.S. Cl. ............ 425/534; 414/222.11; 414/226.01; 414/331.01; 425/540; 425/556; 425/DIG. 38
(58) Field of Classification Search ........ 425/436 RM, 425/534, 540, 556, 818, DIG. 38; 414/222.09, 414/222.11, 226.01, 226.04, 331.01
See application file for complete search history.

(56) References Cited

U.S. PATENT DOCUMENTS

| | | | |
|---|---|---|---|
| 4,140,464 A | | 2/1979 | Spurr et al. .................. 425/533 |
| 4,694,951 A | * | 9/1987 | Gibbemeyer ............. 198/468.3 |
| 4,929,450 A | * | 5/1990 | Takakusaki et al. ........ 425/526 |
| 5,206,039 A | | 4/1993 | Valyi .......................... 425/526 |
| 5,509,796 A | * | 4/1996 | Di Settembrini ............ 425/526 |
| 5,772,951 A | | 6/1998 | Coxhead et al. ............. 264/537 |
| 6,458,324 B1 | * | 10/2002 | Schinzel ....................... 422/65 |
| 2001/0038866 A1 | * | 11/2001 | Glacobbe .................... 425/526 |

* cited by examiner

*Primary Examiner*—Robert Davis
*Assistant Examiner*—Emmanuel S. Luk
(74) *Attorney, Agent, or Firm*—Oliff & Berridge, PLC

(57) ABSTRACT

An object of this invention is to provide a preform conveying device of high production efficiency under the technical theme of aligning the plurality of preforms in single rows at high speed, while eliminating contact of individual preforms with other preforms and minimizing the chances of contact with device parts.

In a state in which a plurality of preforms are aligned vertically and laterally, preforms are received in a manner partitioned in vertical row units, and by putting a conveying line, formed along the direction of a vertical row of preforms, in an inclined orientation in which the downstream side is raised, positioning the upstream end of the conveying line above a preform receiving part, and moving the vertical row unit of preforms that is positioned along the conveying line in the vertical row direction at substantially the same speed as the conveying speed of the conveying line, the respective preforms of the vertical row unit are transferred in a state in which each is sandwiched by the conveying line and this is carried out successively for each vertical row unit to supply the plurality of preforms to a blow molding machine or other subsequent process side upon aligning them in single rows.

8 Claims, 6 Drawing Sheets

(a)

(b)

PREFORM CONVEYING DEVICE

FIELD OF THE ART

This invention relates to a preform conveying device to be used in manufacturing a molded container, such as a polyethylene terephthalate resin bottle, etc., and more specifically relates to a device, which receives, via an unloading device, preforms, molded by an injection molding machine having a plurality of preform molding cavities aligned vertically and laterally, aligns these preforms in single rows, and supplies the preforms to a blow molding machine or subsequent process side.

BACKGROUND ART

Due to their performance, the applications of bottles and other containers formed of a biaxial drawing, blow-molded thermoplastic resin, such as polyethylene terephthalate (PET) resin, etc., are spreading greatly in a wide variety of fields, such as drink bottles, etc. Normally, such molded containers are manufactured by heating and melting a plastic material by an injection molding machine to injection mold test-tube-shaped preforms, conveying these preforms to a blow molding machine, and then guiding the preforms into the mold of the blow molding machine and performing the biaxial drawing blow molding processes of vertical drawing by a draw pin and blowing of compressed air into the preforms.

Various improvements have been attempted in the respective processes in order to increase the production speed of the manufacture of such containers. For example, for the processes of receiving preforms, which have been molded by an injection molding machine having a plurality of preform molding cavities aligned vertically and laterally, aligning these preforms in single rows, and conveying them to the blow molding machine side, a preform conveying device (referred to hereinafter simply as "conveying device"), such as shown in FIG. 6, has been used since priorly to improve the production speed.

The conveying device of FIG. 6 mainly comprises a conveyor part 32, and a preform feeder 33, having a function of aligning the orientation of preforms P in a fixed direction by the rotation action of a disk, and this conveying device receives, by means of the conveyor part, a plurality of preforms P, which have been unloaded by an unloading device 31 from an injection molding machine having a plurality of preform molding cavities, and supplies the preforms to preform feeder 33 to align the orientations of preforms P into single rows by using the centrifugal force due to the rotation of the disk and convey them to the blow molding process side.

However, if the production speed is to be increased further, the preforms must be handled in a state of higher temperature, and with the prior-art method illustrated in FIG. 6, the preforms can get damaged due to collision or friction of preforms with themselves or with device parts.

Also, due to the high probability for preform surfaces coming in contact with parts that make up the device, soiling of preform surfaces occurs at a high frequency.

This invention has been made to solve the above-described problems of the prior art, and an object thereof is to provide a device that receives preforms that have been molded by an injection molding machine having a plurality of preform molding cavities aligned vertically and laterally, aligns these preforms in single rows, and supplies them to a blow molding machine or other subsequent process side, wherein a conveying device of high production efficiency is provided under the technical theme of aligning the plurality of preforms in single rows at high speed, while eliminating contact of individual preforms with other preforms and minimizing the chances of contact with device parts.

DISCLOSURE OF THE INVENTION

In order to achieve the above technical theme, a first aspect of various exemplary embodiments of the preform conveying device of the invention includes a means, wherein provided is a device that receives, via an unloading device, preforms, which have been molded by an injection molding machine having a plurality of preform molding cavities aligned vertically and laterally, supplies these preforms to a subsequent process side upon alignment in single rows, the device comprising: a preform aligning part, having a slide table installed on a frame in a manner enabling sliding in a direction that is a single horizontal direction and having, on the slide table, slide plates, each provided with supporting parts that respectively hold individual preforms in inverted states at alignment positions corresponding to the alignment of the preforms in a single vertical row of the unloading device, the slide plates being at least the same in number as the number of vertical rows of the unloading device and being aligned parallel to a horizontal X-direction, perpendicular to the Y-direction, at intervals corresponding to the alignment of the vertical rows in a maimer enabling sliding individually in the X-direction; and a grip conveyor, having grips formed of a rubber-like soft material for holding the preforms in a sandwiching maimer and having, in a state in which a conveying line formed thereby is aligned in direction in the X-direction and inclined by the raising of a downstream part, an upstream end positioned above the preform alignment part; wherein each slide plate, upon being successively set by the sliding of the slide table in the Y-direction so that its Y-direction position matches the Y-direction position of the conveying line formed by the grip conveyor, is slid in the X-direction at substantially the same speed as the conveying speed of the grip conveyor and moved below the grip conveyor as the individual preforms are transferred to the grip conveyor.

With the above arrangement according to exemplary embodiments, since the X-direction positions of the slide plates, which are the same in number as the number of vertical rows of the plurality of preforms that are aligned vertically and laterally in the unloading device, are first matched with predetermined positions so that the supporting parts are aligned in a manner corresponding to the vertical and lateral alignment of the unloading device, the preforms are transferred to the conveyor device in the same alignment as that in the unloading device.

Then by the sliding of the slide table in the Y-direction, the Y-direction position of the slide plate of the first row is matched with the Y-direction position of the conveying line, formed by the grip conveyor, and is then slid in the X-direction at substantially the same speed as the conveying speed of the grip conveyor to transfer the individual preforms to the grip conveyor while moving below the grip conveyor.

Since in this process of transferring the preforms, the conveying speeds of the slide plate and the grip conveyor are substantially the same and the grip conveyor is in a state in which its downstream part is raised, each preform is sandwiched from both sides at the body part by rubber grips and is removed smoothly from the supporting part while being held upwards to accomplish the transfer from the slide plate to the grip conveyor.

The preforms that have thus been transferred to the grip conveyor are conveyed to the blow molding process side.

Since preforms are handled by the above-described procedures, there is no collision or friction of preforms with each other and since the contact of parts of the conveying device with the outer surfaces of preforms can be restricted to that of the gripping by the grips formed of a rubber-like, soft material, the problem of flawing of the preforms or the problem of the soiling of the outer surfaces of preforms will not occur.

Also, since only the preforms are moved to the blow molding process or other subsequent process side and since movement to the subsequent process side, return to the conveying device, and realignment are thus made unnecessary for the supporting parts, the conveying device can be made simple in structure and handling.

A second aspect of exemplary embodiments includes the slide table being installed in a manner enabling rising and lowering with respect to the frame.

Normally in unloading preforms from the injection molding machine by use of the unloading device and transferring them to the conveying device, the unloading device is rotated to put the preforms in an inverted orientation and is lowered in position in the height direction to bring the preforms close to the supporting parts, and the preforms are dropped across some height and thereby transferred to the respective supporting parts.

With the arrangement of the second aspect, since the slide table can be raised or lowered to set the height position of the supporting parts to an appropriate position, the transfer of the preforms from the unloading device can be performed more smoothly and the degree of freedom of the configuration of the injection molding machine, unloading device, and conveying device can be increased.

Also, by combining the operation of the unloading device and the rising/lowering operation of the slide table, the time required for transferring the preforms can be shortened.

A third aspect of exemplary embodiments includes each supporting part having a head part, which is fitted into a preform from a mouth part and maintains the orientation of the preform, and this head part being arranged to be swingable in its orientation within a fixed range.

Though with regard to the arrangement of a supporting part, for example a method of providing an indented part into which the mouth part of the preform is fitted, a method of providing a protruding part that is fitted into the mouth part, etc., may be employed according to purpose, with the above-described arrangement of the third aspect, even if there is a slight positional deviation and there is a slight tilt in the orientation of a preform when the preform is transferred from the unloading device to a supporting part, the head part can accommodate for this deviation and tilt by tilting to enable smooth transfer to be achieved, the tolerance of the precision of the positioning of devices to be widened, the device arrangement to be simplified, the time required for positional adjustments to be shortened, and thus the production speed to be improved.

Also, when a preform is transferred from a slide plate to the grip conveyer, the downstream part of the grip conveyer is raised and set in an inclined manner to pull up and remove the preform from a supporting part, and this removal can be carried out smoothly by making the head part swingable in orientation. Production problems can thus be prevented and the widening of the tolerance of the precision of the positioning of devices, simplification of the device arrangement, and improvement of the production speed are enabled for this reason as well.

A fourth aspect of exemplary embodiments includes the material and shape of each grip and the spacing between grips that sandwich a preform from both sides being arranged to enable slipping between the preform and the grips under a loaded state of a fixed range or more.

With the above-described arrangement of the fourth aspect, when in the conveying of preforms by the grip conveyor, the movement of the preforms is disabled for some reason and a load of a fixed range or more is generated, just the grip conveyor can be actuated without moving the preforms to enable countermeasures against production problems to be taken readily.

A fifth aspect of exemplary embodiments includes each grip being made of a short quadrilateral tube in shape, with the shape of the quadrilateral of the short quadrilateral tubular body being a parallelogram with which, with respect to a base end edge that is fixed to a chain of the grip conveyor, a grip edge that opposes the base end edge and contacts a preform is shifted in parallel in the direction opposite the direction of progress of the chain.

With the above-described arrangement of the fifth aspect, when the movement of the preforms is disabled for some reason and a load of a fixed range or more is generated, since the parallelogram shapes of the grips collapse further in the direction opposite the direction of progress of the chain and flatten, the slipping between the grips and preforms is made smoother.

BEST MODE FOR CARRYING OUT THE INVENTION

An embodiment of this invention's conveying device shall now be described with reference to FIGS. 1 through 5.

Figure 1:
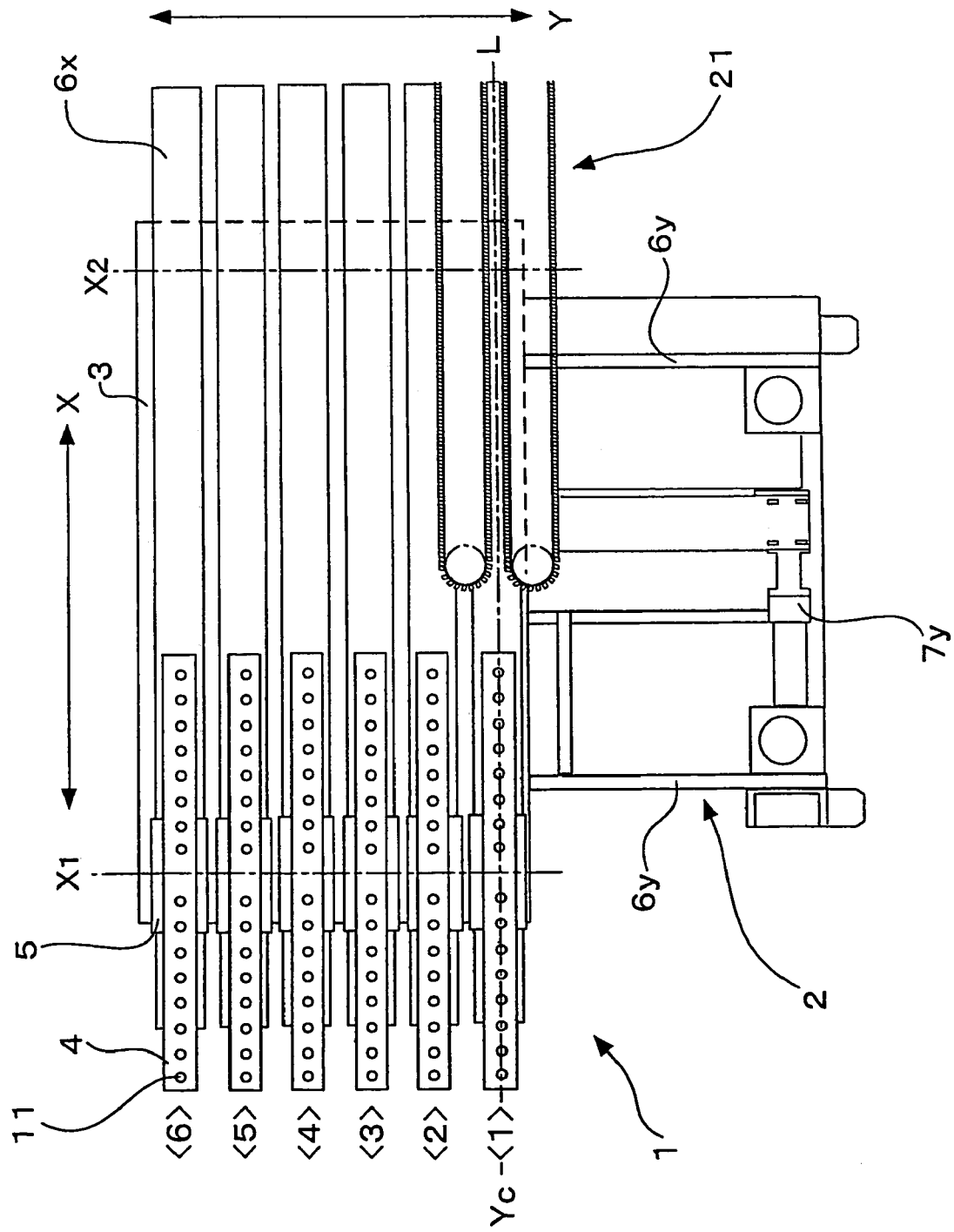
FIG. 1 is an overall plan view showing an embodiment of this invention.

FIG. 1 is a plan view showing an embodiment of this invention's conveying device and shows a state prior to the receiving of preforms P from an unloading device 31 by conveying device.

As shown in FIG. 1, conveying device comprises a frame 2, a slide table 3, which is slidably mounted on frame 2, six slide plates 4, disposed in parallel on slide table 3, a grip conveyor 21, etc., and a preform alignment part 1 is formed by the six slide plates 4.

Frame 2 is equipped with two Y-axis rails 6y, which run parallel along a Y-direction, and slide table 3 is set on Y-axis rails 6y in a manner such that it is movable with its upper face being horizontal. Frame 2 is provided with a Y-axis servo motor 7y and slide table 3 is driven along Y-axis rails 6y by Y-axis servo motor 7y. Furthermore, the entirety of slide table 3, including Y-axis servo motor 7y, is supported from below by a cylinder 8 and enabled to be raised or lowered suitably by actuation of cylinder 8.

Six X-axis rails 6x are installed in parallel along an X-direction on slide table 3, and on each of the six X-axis rails 6x is installed a slider 5 in a manner such that it is movable with its upper face being horizontal. When an X-axis rail 6x is positioned above a conveying line L, a slider 5 is moved along the X-axis rail 6x by the driving of an X-axis servo motor 7x installed on conveying line L. Furthermore, onto this slider 5 is fixed a slide plate 4 having 16 supporting parts 11 mounted on the upper face as shown in FIG. 1.

As shown in FIGS. 4(a) and (b), a supporting part 11 comprises a head part 12, a fixed part 13, which is fixed to a slide plate 4, a shaft pin 14, which is slidably mounted inside fixed part 13, a spring holding part 16, which is fixed to a lower part of shaft pin 14, a spring 15, which urges shaft pin 14 downwards via holding part 16, etc.

Fixed part 13 is fitted and fixed by screwing in a circular hole formed in slide plate 4 and has a hole in the center through which shaft pin 14 passes. Head part 12 as a whole is formed to a shape that holds a preform P in an inverted orientation by being fitted in from an opening at a mouth part P1. Also, the lower end face of head part 12 is formed to a spherical shape that protrudes downwards. This head part 12 is screwed onto and thereby assembled and fixed onto the upper end part of shaft pin 14.

Since as mentioned above, shaft pin 14 is urged downwards by spring 15 via spring holding part 16 and the lower end face of head part 12 is spherical, supporting part 11 is put in contact in a pressed state against the upper end face of fixed part 13 and is allowed to undergo a swinging motion within a predetermined range.

In the mold (not shown) for injection molding of preforms P, 16 cavities are formed in the vertical direction and six such rows of cavities are aligned in the lateral direction, that is, a total of 96 cavities are aligned. Preforms P that have been injection molded are unloaded by unloading device 31 in the same state of alignment as this alignment of cavities. The preforms P that have been unloaded by unloading device 31 are transferred to the conveying device.

FIG. 1 shows a state in which the centers in the X-direction of the respective slide plates 4 (for convenience, the symbols <1> to <6> are attached to distinguish the respective slide plates 4) are aligned at a position X1 and the central axis in the Y-direction of slide plates 4 of the first row (indicated by <1> here) are aligned at a position Yc in the Y-direction of conveying line L of grip conveyor 21, which shall be described later.

By aligning slide plates 4 at position X1 and position Yc as described above, supporting parts 11 are made to correspond to the alignment state of unloading device 31.

Figure 5:
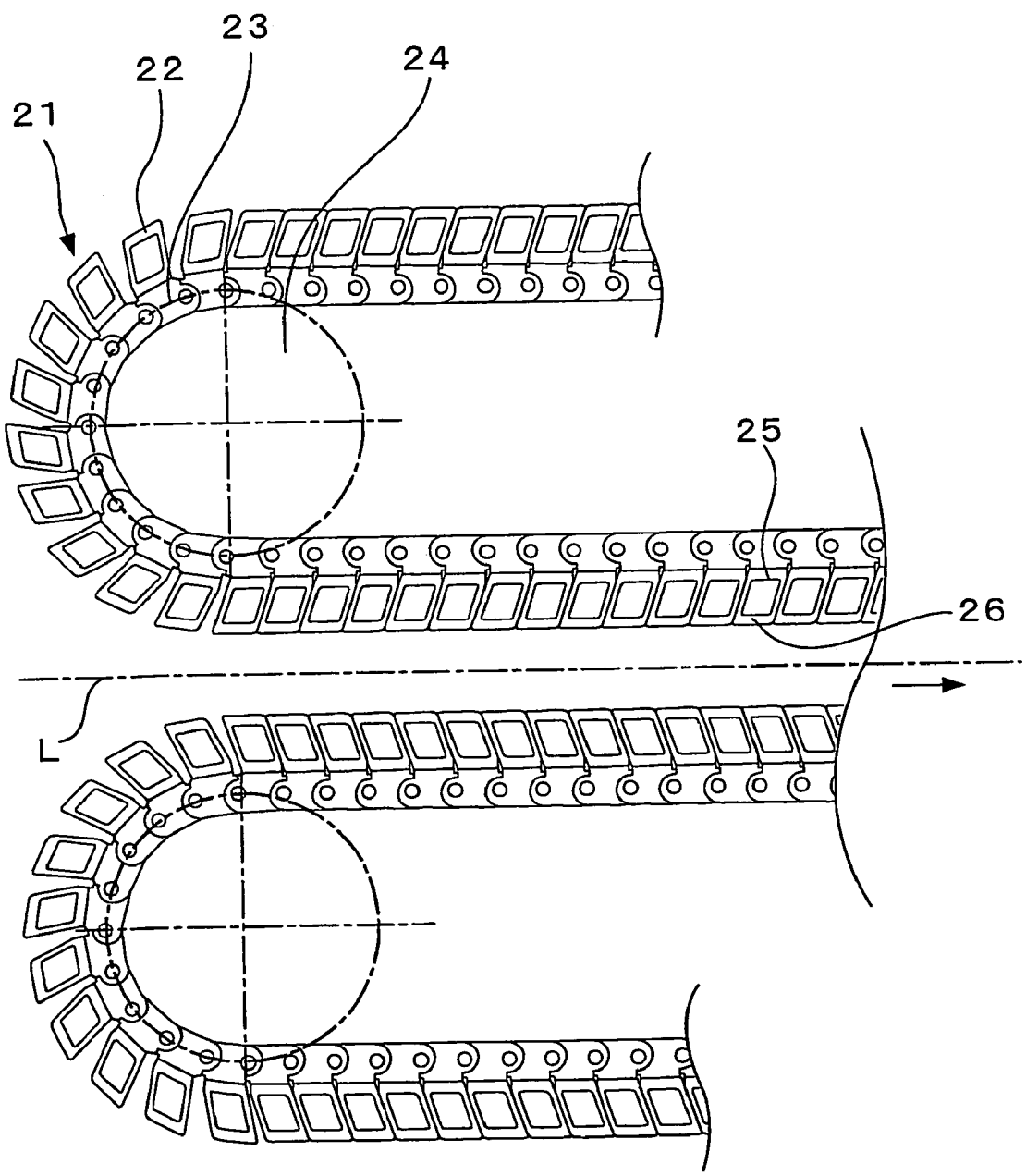
FIG. 5 is a plan view showing the principle parts of the grip conveyor of the embodiment shown in FIG. 1 in an enlarged manner.
Figure 6:
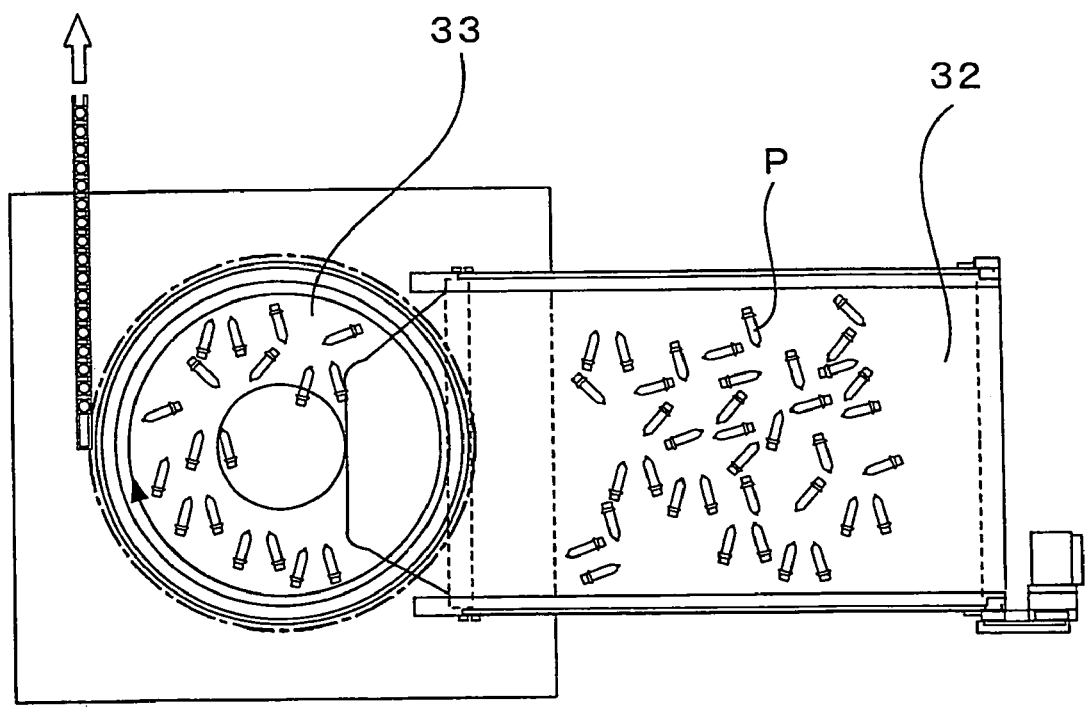
FIG. 6 is an explanatory diagram showing an example of a prior-art preform conveying device.
Figure 6:
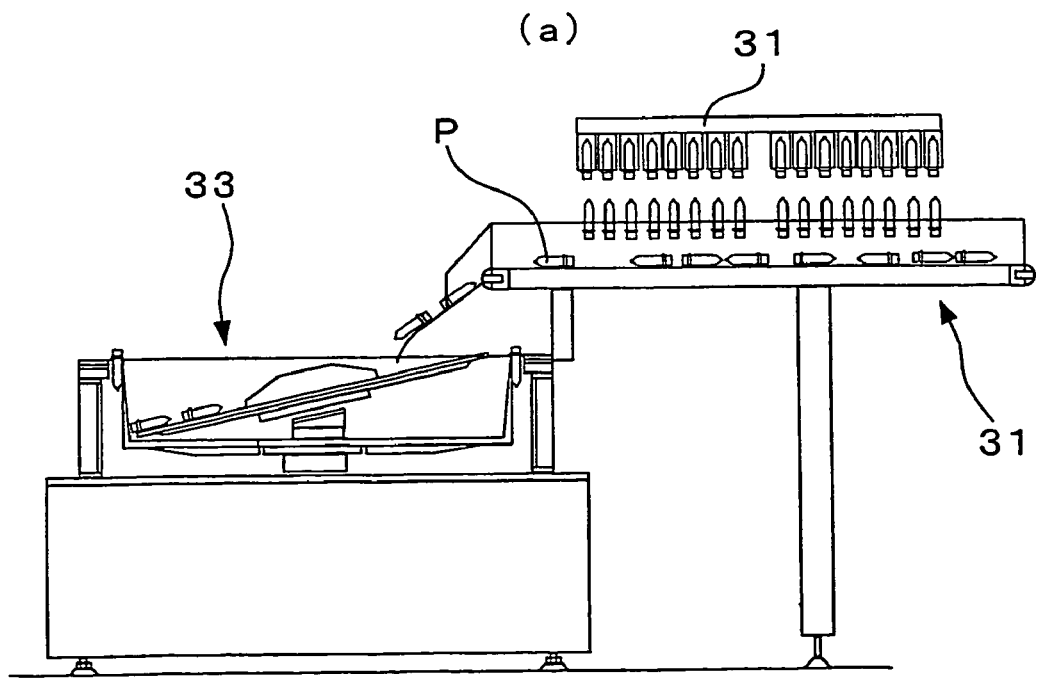

FIG. 5 is a plan view showing the principle parts of grip conveyor 21 in an enlarged manner. Grip conveyor 21 has chains 23, revolvably wound between rotating bodies 24, disposed in an opposing manner at both sides of conveying line L along the X-direction. Each chain 23 has rubber grips 22 mounted in a continuous manner and conveys preforms P in the direction of the arrow with the body parts P2 of preforms P being sandwiched by grip parts 22.

Figure 3:
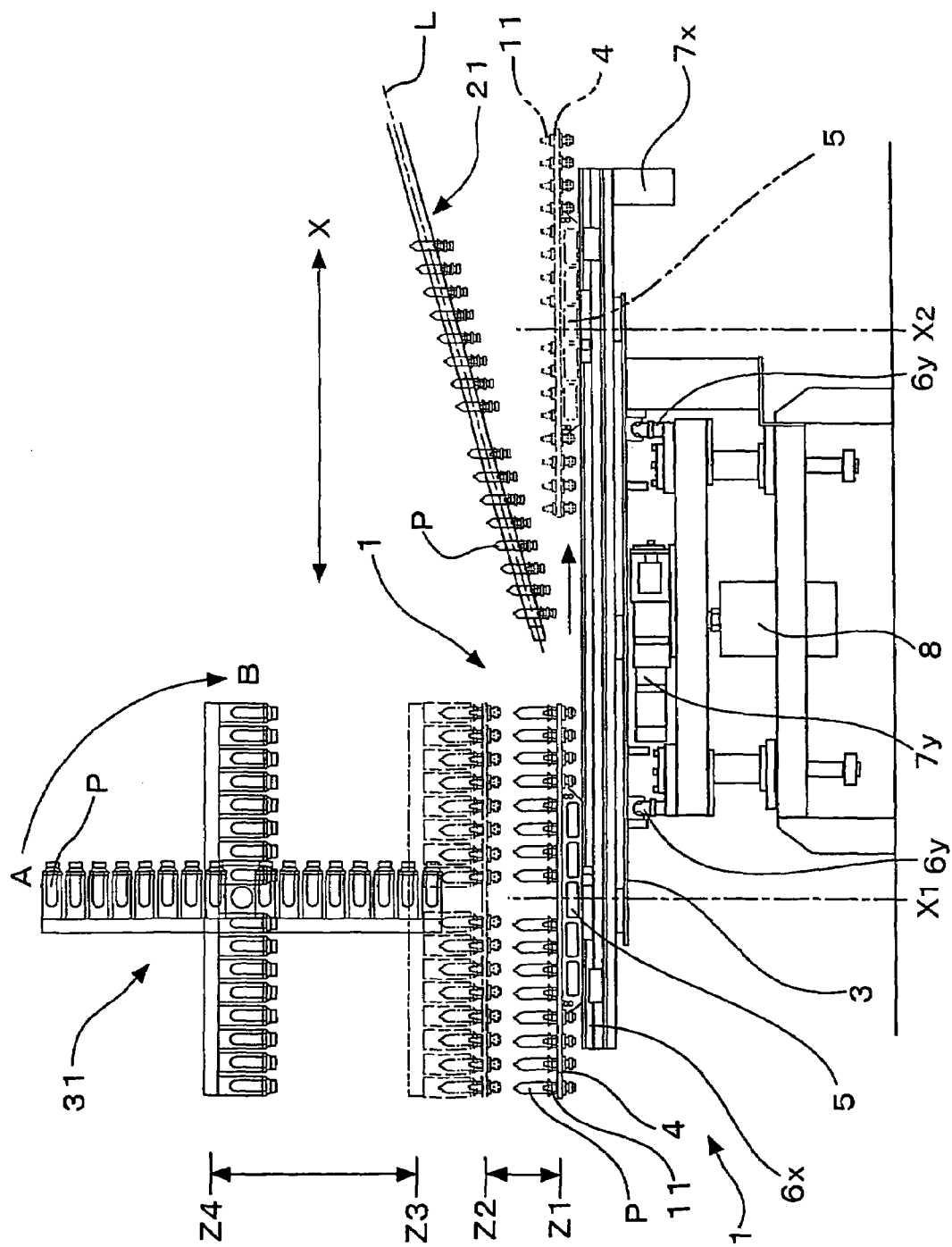
FIG. 3 is a side view showing a state of progress of the conveying of preforms according to the embodiment shown in FIG. 1.
Figure 4:
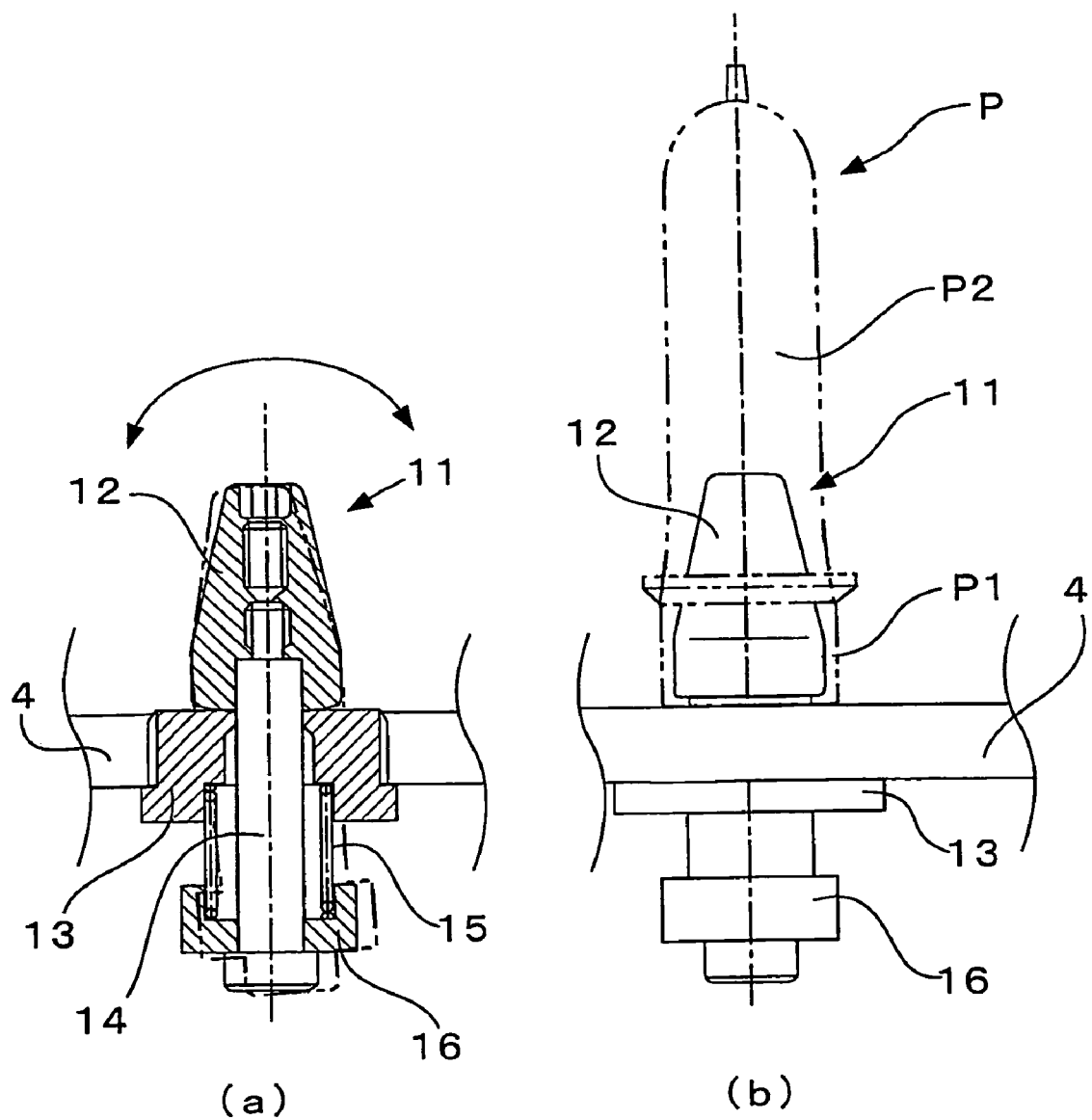
FIG. 4 shows a (a) partial longitudinal sectional view and a (b) side view of a preform supporting part of the embodiment shown in FIG. 1.

Furthermore, conveying line L has its upstream end positioned above preform alignment part 1 and has its downstream part raised upwards and inclined (see FIGS. 1 and 3).

Also, as shown in FIG. 5, each grip 22 is formed to a short quadrilateral tube with a parallelogram shape with which, with respect to a base end edge 25 that is fixed to chain 23, a grip edge 26 at the side that contacts a preform P is shifted in parallel in the direction opposite the direction of progress of chain 23. By making grips 22 be of this shape, even when preforms P become unmovable within conveying line L, the parallelograms of grips 22 will flatten by deforming in the direction opposite the direction of conveying of preforms P and enable slipping of preforms P and grips 22 so that grip conveyor 21 will not stop completely and measures for the occurrence of a problem can be taken readily.

The method by which preforms P are conveyed using conveying device shall now be described using FIGS. 1, 2, and 3.

FIG. 3 shows states in which preforms P are transferred from unloading device 31 to slide plates 4 and are transferred from slide plates 4 to grip conveyer 21.

First, normally upon unloading preforms P from the cavities of the mold of the injection molding machine, unloading device 31 is in the state indicated as A. From this A state, rotation by 90° is performed to reach the state indicated by B, in other words, the respective preforms P are put in inverted states, and preforms P are then lowered from a height position Z4 to a position Z3.

Meanwhile, Y-axis servo motor 7y, etc., are actuated to put the positions of slide table 3 and slide plates 4 in the X-Y plane in the state shown in FIG. 1. Also with regard to the height direction, slide table 3 is raised from a position Z1 to a position Z2 by means of cylinder 8. Then upon slightly fitting head parts 12 of supporting parts 11 in mouth parts P1 of preforms P, the respective preforms P are dropped across some height. The respective preforms P thus become fixed as they are in the inverted orientations onto the corresponding head parts 12.

Positions Z1 to Z4 are set to optimal values according to the configuration of the injection molding machine, unloading device 31, and conveying device, the times required for the respective processes, etc. The height across which preforms P are to be dropped onto supporting parts 11 is set to a value by which head parts 12 can be fitted without fail into mouth parts P1. Here, since head parts 12 are swingable in orientation, positioning errors can be compensated by the swinging actions and the process of fitting into mouth parts P1 can be accomplished smoothly.

At unloading device 31, the operations of holding and dropping preforms P onto the supporting parts are performed.

Also, slide table 3 does not necessarily have to be raised from position Z1 to position Z2 in general, and unloading device 31 may instead be arranged to be lowered to an appropriate position with respect to slide table 3 positioned at position Z1 to transfer preforms P. However, in a case where the transfer speed of preforms P is to be increased as described above or in a case where the dimensions of preforms P are changed, etc., it is preferable to raise or lower the position of slide table 3.

When preforms P have been fitted onto supporting parts 11, unloading device 31 and slide table 3 return to the original height position Z4 and position Z1, respectively. Then as shown in FIG. 1, the position in the Y-direction of slide plate 4 of <1> becomes the position Yc on conveying line L of grip conveyor 21, and by X-axis servo motor 7x being driven in this state, slider 5 moves in the direction of a position X2 along X-axis rails 6x. By the movement of slider 5, slide plate 4 is moved below grip conveyer 21, and the individual preforms P are then transferred to grip conveyor 21.

In this process, since the movement speed of slide plate 4 in the direction of position X2 and the conveying speed of grip conveyor 21 are made equal and grip conveyor 21 is raised at its downstream side and put in an inclined state, mouth part P1 of each preform P becomes removed smoothly from head part 12 of supporting part 11 in the transfer process.

Also, even if the positioning deviates somewhat due to reasons of mechanical dimensional precision and the inner peripheral face of a mouth part P1 of a preform P contacts head part 12 somewhat, since head part 12 is arranged to be swingable in orientation within a fixed range, such a deviation can be absorbed by the swinging of head part 12 and the transfer can be accomplished smoothly.

Though with the above-described embodiment, a case where the movement speed of slide plate 4 and the conveying speed of grip conveyor 21 are set to the same speed was described, there are also cases where the transfer of preforms P can be achieved more smoothly by providing a difference in the speeds of the two components.

When the transfer of preforms P on slide plate 4 of <1> in the above-described manner is completed, slide table 3 is moved by means of Y-axis servo motor 7y and the same operations are repeated upon setting slide plate 4 of <2> at position Yc.

Figure 2:
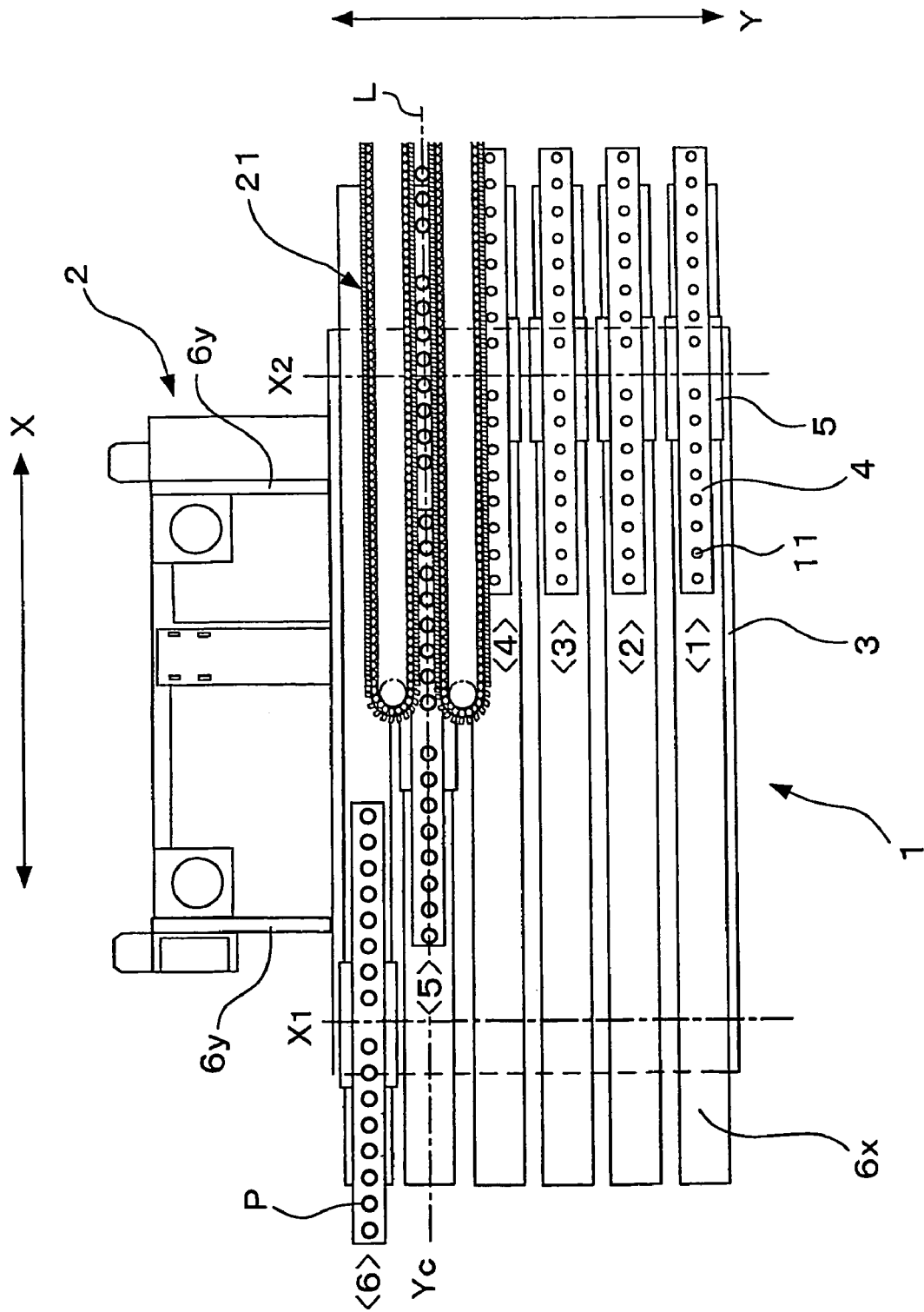
FIG. 2 is a plan view showing a state of progress of the conveying of preforms according to the embodiment shown in FIG. 1.

FIG. 2, is a plan view like FIG. 1 and shows a state in which slide plate 4 of <5> is set at position Yc and preforms P are transferred to grip conveyor 21. Preforms P on slide plates 4 of <1> to <6> are thus transferred successively to grip conveyor 21, thereby arranging the vertically and laterally aligned plurality of preforms P in single rows and conveying them to the blow molding process or other subsequent process side.

When the transfer of preforms P on slide plate 4 of <6> is completed, the positions of slide table 3 and slide plates 4 are returned to the state shown in FIG. 1 and preforms P, molded by the injection molding machine, are received from unloading device 31 again.

EFFECTS OF THE INVENTION

With the first aspect of various exemplary embodiments the preform conveying device of the invention, collision or friction of preforms with each other can be eliminated, and since the contact of parts of the conveying device with the outer surfaces of preforms can be restricted to that of the gripping by rubber grips formed of a rubber-like, soft material, the problem of flawing of the preforms or the problem of the soiling of the outer surfaces of preforms will not occur.

Also, since only the preforms are moved to the blow molding process or other subsequent process side and since movement to the subsequent process side, return to the conveying device, and realignment are thus made unnecessary for the supporting parts, the conveying device can be made simple in structure and handling.

With the second aspect of the invention, since the slide table can be set at an appropriate position by raising or lowering of the slide table, the transfer of the preforms from the injection molding machine to the conveying device can be performed smoothly and production problems can be restrained.

Also, the degree of freedom of the configuration of the injection molding machine, unloading device, and preform conveying device can be increased, and furthermore, by combining the operation of the unloading device and the rising/lowering operation of the slide table, the time required for transferring the preforms can be shortened.

With the third aspect of the invention, since the head parts of supporting parts are made swingable, the transfer of preforms from the preform unloading device to the supporting parts and the transfer of preforms from the supporting parts to the grip conveyor can be accomplished more smoothly, thus enabling the prevention of production problems as well as the widening of the tolerance of the precision of the positioning of devices, simplification of the device arrangement, shortening of the time required for positional adjustments, and improvement of the production speed.

With the fourth aspect of the invention, since the material and shape of each grip and the spacing between grips are arranged to enable slipping between the preform and the rubber grips under a loaded state of a fixed range or more so that just the conveyor can be made movable when the movement of the preforms is disabled for some reason, countermeasures against production problems can be taken readily.

With the fifth aspect of the invention, since grips with a parallelogram shape are flattened by collapsing in the direction opposite the direction of conveying of the preforms, the slipping between the grips and preforms can be made smooth without excess effort.

What is claimed is:

1. A preform conveying device, receiving, via an unloading device (31), preforms (P), which have been molded by an injection molding machine having a plurality of preform molding cavities aligned vertically and laterally, and supplying said preforms (P) to a subsequent process side upon alignment in single rows, said device comprising: a preform aligning part (1), having a slide table (3) installed on a frame (2) in a manner enabling sliding in a Y-direction that is a single horizontal direction and having, on said slide table (3), slide plates (4), each provided with supporting parts (11) that respectively hold individual preforms (P) in inverted states at alignment positions corresponding to the alignment of the preforms (P) in a single vertical row of said unloading device (31), said slide plates (4) being at least the same in number as the number of vertical rows of said unloading device (31) and being aligned parallel to a horizontal X-direction, perpendicular to the Y-direction, at intervals corresponding to the alignment of said vertical rows in a manner enabling sliding individually in the X-direction; and a grip conveyor (21), having grips (22) formed of a rubber-like soft material for holding said preforms (P) in a sandwiching manner and having, in a state in which a conveying line (L) formed thereby is aligned in direction in the X-direction and inclined by the raising of a downstream part, an upstream end positioned above said preform alignment part (1); wherein each slide plate (4), upon being successively set by the sliding of said slide table (3) in the Y-direction so that its Y-direction position matches the Y-direction position of the conveying line (L) formed by said grip conveyor (21), is slid in the X-direction at substantially the same speed as the conveying speed of said grip conveyor (21) and moved below said grip conveyor (21) as the individual preforms (P) are transferred to the grip conveyor (21).

2. The preform conveying device according to claim 1, wherein the slide table (3) is installed in a manner enabling rising and lowering with respect to the frame (2).

3. The preform conveying device according to claim 1, wherein each supporting part (11) has a head part (12), which is fitted into a preform (P) from a mouth part (P2) and maintains the orientation of said preform (P), said head part (12) being arranged to be swingable in its orientation within a fixed range.

4. The preform conveying device according to claim 1, wherein the material and shape of each grip (22) and the spacing between grips (22) that sandwich a preform (P) from both sides are arranged to enable slipping between said preform (P) and the grips (22) under a loaded state of a fixed range or more.

5. The preform conveying device according to claim 4, wherein each grip (22) is made a short quadrilateral tube in shape with the shape of the quadrilateral of the short quadrilateral tubular body being a parallelogram with which, with respect to a base end edge that is fixed to a chain (23) of the grip conveyor (21), a grip edge (26) that opposes said base end edge (25) and contacts a preform is shifted in parallel in the direction opposite the direction of progress of the chain (23).

6. The preform conveying device according to claim 2, wherein each supporting part (11) has a head part (12), which is fitted into a preform (P) from a mouth part (P2) and maintains the orientation of said preform (P), said head part (12) being arranged to be swingable in its orientation within a fixed range.

7. The preform conveying device according to claim 2, wherein the material and shape of each grip (22) and the spacing between grips (22) that sandwich a preform (P) from both sides are arranged to enable slipping between said preform (P) and the grips (22) under a loaded state of a fixed range or more.

8. The preform conveying device according to claim 3, wherein the material and shape of each grip (22) and the spacing between grips (22) that sandwich a preform (P) from both sides are arranged to enable slipping between said preform (P) and the grips (22) under a loaded state of a fixed range or more.

* * * * *

UNITED STATES PATENT AND TRADEMARK OFFICE
CERTIFICATE OF CORRECTION

PATENT NO. : 7,077,641 B2  Page 1 of 1
APPLICATION NO. : 10/497318
DATED : July 18, 2006
INVENTOR(S) : Tadao Hirasawatsu, Shigeaki Amari and Goichi Kato It is certified that error appears in the above-identified patent and that said Letters Patent is hereby corrected as shown below:

<u>Column 2,</u>
Line 20, "direction" (first occurrence) should read -- Y-direction --.

<u>Column 2,</u>
Line 32, "maimer" should read -- manner --.

Signed and Sealed this

Fourteenth Day of November, 2006

JON W. DUDAS
*Director of the United States Patent and Trademark Office*